Oct. 18, 1955     T. C. DINGMAN ET AL     2,720,775
GLOVE COMPARTMENT LOCK
Filed Aug. 27, 1953     2 Sheets-Sheet 1
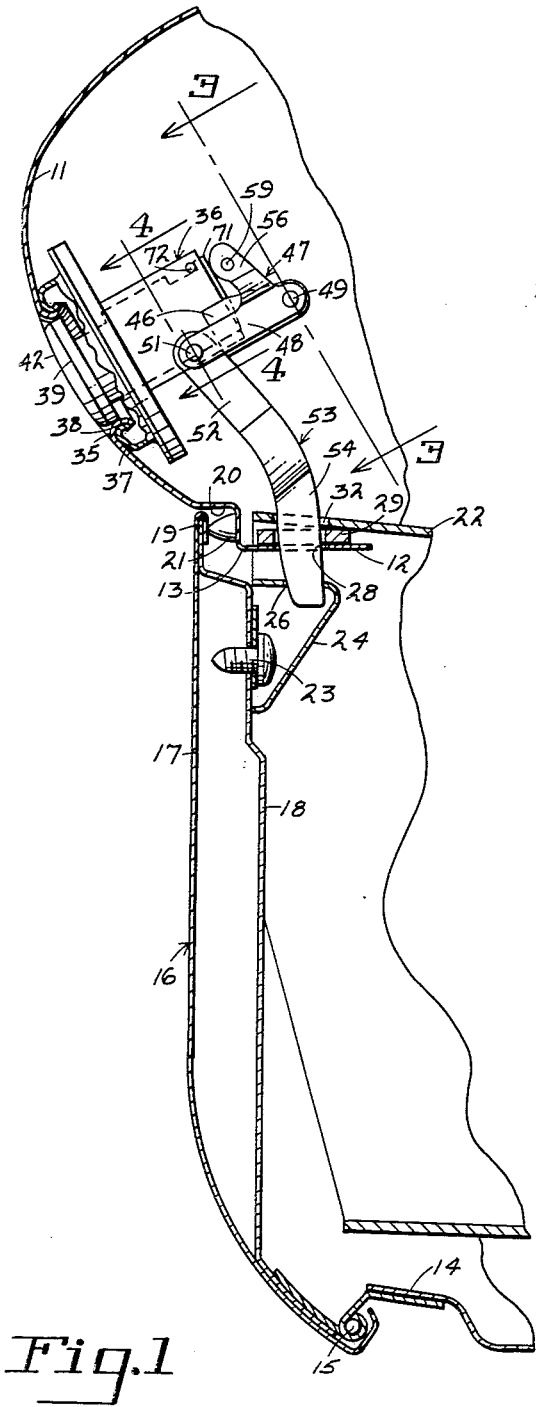
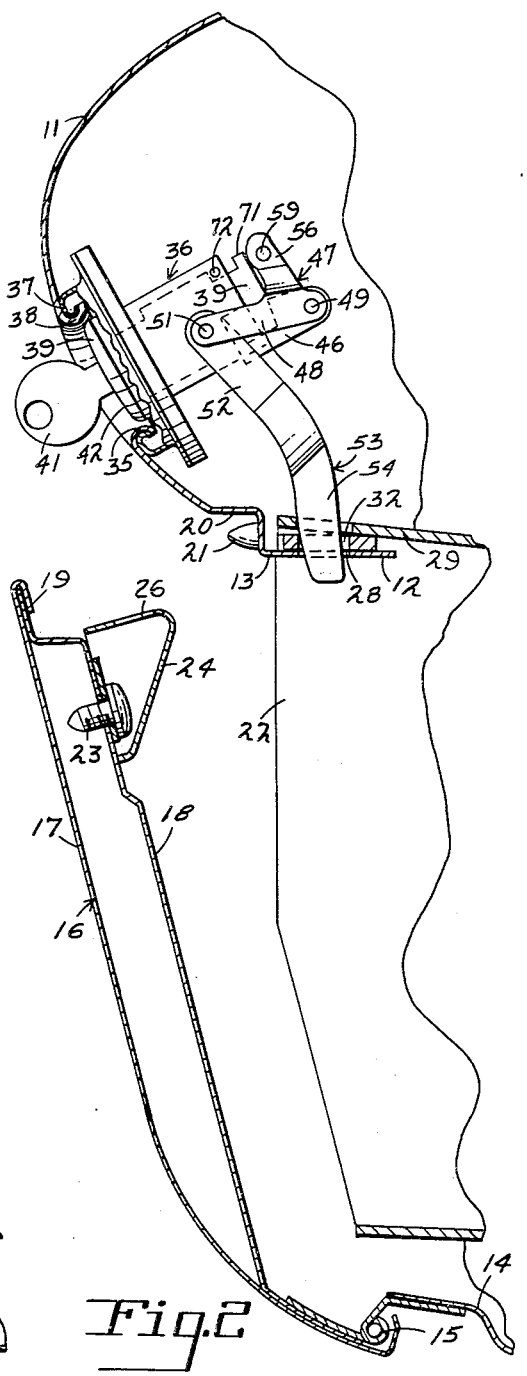
INVENTORS.
T. C. DINGMAN.
E. F. COOK.
BY
ATTORNEYS Oct. 18, 1955     T. C. DINGMAN ET AL     2,720,775
GLOVE COMPARTMENT LOCK Filed Aug. 27, 1953     2 Sheets-Sheet 2

INVENTORS.
T. C. DINGMAN.
E. F. COOK.
BY
ATTORNEYS

2,720,775

GLOVE COMPARTMENT LOCK

Thomas C. Dingman, Dearborn, and Ernest F. Cook, Detroit, Mich., assignors to Ford Motor Company, Dearborn, Mich., a corporation of Delaware Application August 27, 1953, Serial No. 376,828

2 Claims. (Cl. 70—83)

This invention relates generally to locks, and particularly to glove compartment locks for motor vehicles.

An object of the present invention is to provide a glove compartment lock for a motor vehicle in which the lock cylinder is located on the instrument panel in a fixed location outside the perimeter of the glove compartment door, and which is arranged to control the latching and unlatching of the glove compartment door. A further object is to provide a device of this type which is inexpensive to manufacture and install and which provides a positive, trouble free latch.

Other objects and advantages of this invention will be made more apparent as this description proceeds, particularly when considered in connection with the accompanying drawings, wherein:

Figure 1 is a vertical cross-sectional view through the instrument panel, glove compartment door, and glove compartment door lock of the present invention.

Figure 2 is a cross-sectional view similar to Figure 1 but showing the structure in the unlatched position.

Figure 3:
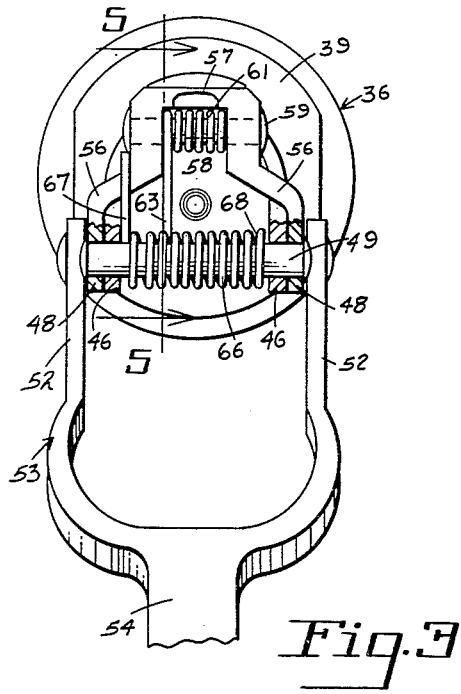
Figure 3 is a rear elevational view, partly in section, of the latch mechanism shown in Figure 1, taken on the plane indicated by the line 3—3 of Figure 1.
Figure 4:
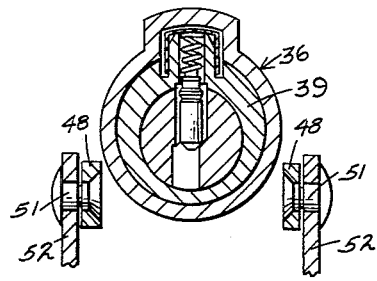
Figure 4 is a cross-sectional view taken of the plane indicated by the line 4—4 of Figure 1.

Referring now to the drawings, the reference character 11 indicates the instrument panel of a motor vehcile, and is shown as being arcuate or curved in cross-section. The instrument panel 11 has a forwardly extending and downwardly offset generally horizontal flange 12 forming the upper boundary of a glove compartment opening 13. The lower boundary of the glove compartment opening 13 is formed by a flange 14 projecting rearwardly from the lower portion of the instrument panel. Hinged to the flange 14 by a hinge 15 is a glove compartment door 16 formed of outer and inner panels 17 and 18 respectively. The outer and inner panels of the glove compartment door 16 are joined at their upper edges to form a marginal flange 19 adapted in the closed position of the door to be seated within an offset portion 20 of the instrument panel 11. Suitable resilient stop means 21 are mounted in the recessed portion 20 of the instrument panel to form abutments for the marginal flange 19 of the door. A conventional cardboard glove compartment box 22 is mounted upon the vehicle body adjacent the glove compartment opening 13 in the instrument panel.

Secured to the inner panel 18 of the glove compartment door by means of screws 23, 16 is a striker plate bracket 24. The striker plate bracket 24 is provided with a rectangular opening 26 in the upper portion thereof to receive a latch (to be described hereinafter).

The forwardly extending horizontal flange 12 of the instrument panel 11 is formed with an opening 28 and is reinforced by a latch guide reinforcement 29. The guide 29 is in the form of a rectangular plate secured to the flange 12 and is provided with a central rectangular opening 32 arranged in alignment with the opening 28 in the flange 12.

The instrument panel 11 is provided with an opening 35 spaced a predetermined distance above the central portion of the marginal flange 19 of the glove compartment door 16. A latch housing 36 is received within the opening 35 and is provided with a flange 37 abutting the rearward face of the instrument panel. The edge portions 38 of the instrument panel adjacent the opening 35 are crimped or rolled around the flange 37 of the latch cylinder to retain the latter in position upon the instrument panel.

A lock cylinder 39 of conventional construction is reciprocably mounted within the housing 36 and is provided with conventional tumblers (not shown) controlled by means of a key 41 to prevent reciprocation of the lock cylinder when in locked position. When unlocked, however, the outer end 42 of the lock cylinder 39 can be manually pushed to move the cylinder from the latched position shown in Figure 1 to the unlatched position shown in Figure 2.

The housing 36 is formed at its inner end with a pair of integrally formed forwardly extending laterally spaced ears 46. A bifurcated bell crank lever 47 is pivotally mounted upon the inner ends of the ears 46. The bell crank lever 47 has a pair of longitudinally extending laterally spaced arms 48 straddling the ears 46 of the housing 36 and pivotally connected at their inner ends to the ears 46 by means of a bolt 49.

The opposite ends of the arms 48 of the bell crank lever 47 are pivotally connected by means of rivets 51 to the outwardly extending bifurcated arms 52 of the door latch 53. The bifurcated arms 52 are integrally formed upon the upper end of the body portion 54 of the latch 53. The body portion 54 is rectangular in cross-section and extends through the rectangular opening 32 in the guide plate 29 carried by the horizontal flange 12 of the instrument panel, and projects into the rectangular opening 26 in the striker plate bracket 24 carried by the glove compartment door 16. It will be apparent that wtih the latch 53 in the operative position as shown in Figure 1, the glove compartment door 16 is retained in its closed position.

Figure 5:
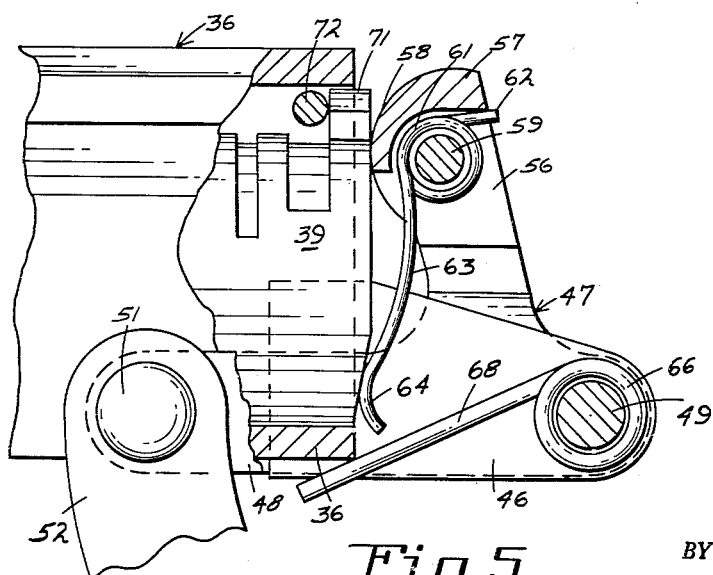
Figure 5 is an enlarged cross-sectional view taken on the plane indicated by the line 5—5 of Figure 3.

The longitudinally extending arms 48 of the bell crank lever 47 are formed integrally with the upwardly extending arm 56 which, as best seen in Figure 3, is bifurcated to form laterally spaced portions integrally connected at their upper ends by means of an interconnecting upper wall 57. As best seen in Figure 5, the upper wall 57 of the bell crank lever 47 is formed with an arcuate surface 58 facing the adjacent end of the lock cylinder plunger 39 to be engaged thereby. A pin 59 extends through the bifurcated upwardly extending arm 56 of the bell crank lever and supports a spring 61 coiled around the pin between the bifurcations. One end 62 of the spring is seated against the upper wall 57 of the bell crank lever while the opposite end 63 of the spring is extended downwardly and terminates in a curved end portion 64 engageable with the lower portion of the inner end of the lock cylinder 39.

A second return spring 66 is coiled around the pin 49 between the laterally spaced ears 46 of the housing 36. One end 67 of this spring is extended upwardly and bears against one of the bifurcations of the arm 56 of the bell crank lever, while the opposite end 68 of the spring extends generally horizontally and engages the housing 36 of the latch mechanism.

In the position of the structure shown in Figure 1, the return springs 61 and 66 urge the bell crank lever 47 in a clockwise direction about the pivot pin 49 to hold the lower end of the latch 53 in engagement with the striker plate bracket 24 of the glove door 16, and also to maintain the arcuate wall 58 of the upper portion 57 of the bell crank lever in engagement with the inner end of the lock cylinder plunger 39 to return the latter to its outermost position. This position is determined by engagement of the inner flange 71 of the lock cylinder plunger with a stop pin 72 carried by the housing 36. When the lock cylinder is released by means of the key 41 and manually pressed inwardly, the bell crank lever 47 is rotated against the action of the return springs in a clockwise direction to lift the latch 53 from the striker 24, permitting the glove compartment door 16 to open. The door 16 opens automatically by gravity by reason of its forwardly offset hinge axis 15. When the pressure upon the lock cylinder is released it is automatically returned by the return springs to the position shown in Figure 1, lowering the lower end of the latch 53 into the path of the striker 24 when the glove compartment door 16 is next closed. The curved lower end of the latch 53 rides over the striker 24 until it drops into the opening 26 formed in the striker to again latch the door.

It will be understood that the invention is not to be limited to the exact construction shown and described, but that various changes and modifications may be made without departing from the spirit and scope of the invention, as defined in the appended claims.

What is claimed is:

1. A latch mechanism for a glove compartment door serving as a closure for a glove compartment in the instrument panel of a motor vehicle with said instrument panel having a forwardly projecting portion adjacent the upper portion of the glove compartment and a curved upwardly extending portion above the glove compartment door, said glove compartment door being hingedly mounted at its lower end and carrying at its upper end a striker plate having an aperture therein, comprising, a lock cylinder housing adapted to project through an opening in the curved upper portion of the instrument panel directly above the upper edge of the glove compartment door and secured therein, a lock cylinder plunger reciprocably mounted within said housing, said housing having a pair of laterally spaced ears at its inner end, a bell crank lever having a generally inverted U-shaped upper arm with its upper portion engageable with one end of the lock cylinder plunger and with its lower end straddling the lock cylinder housing ears and pivotally connected thereto by means of a pin, said bell crank lever also having a pair of laterally spaced arms extending from the lower portion of the upper inverted U-shaped arm, spring means encircling said pin having one end engageable with said housing and the opposite end engageable with said upper arm of the bell crank lever to constantly urge the latter in a direction toward said lock cylinder plunger, and a yoke-shaped latch having bifurcated upper arm portions straddling the laterally spaced lower arms of the bell crank lever and pivotally connected thereto, said yoke-shaped latch also having a downwardly depending integral prong adapted to project through an opening in the portion of the instrument adjacent the upper portion of the glove compartment into the path of the striker carried by the glove compartment door for engagement therewith.

2. In a latch mechanism for a motor vehicle glove compartment door hingedly connected at its lower edge to the vehicle instrument panel and carrying at its upper edge a striker member, a lock cylinder housing adapted to be mounted upon an instrument panel vertically above the upper edge of said glove compartment door and projecting inwardly therefrom, a pair of ears integrally formed with said housing and projecting inwardly from the inward portion thereof, a lock cylinder reciprocably mounted within said housing, a bell crank lever pivotally connected to the inwardly projecting ears of the housing, said bell crank lever having an upwardly extending arm including an upper end portion engageable with the inward end of the lock cylinder and bifurcated portions formed integrally with said upper end portion and extending downwardly therefrom, said bell crank lever having lower arm portions formed integrally with the bifurcated portions of the upper arm and projecting toward the outward end of said housing and straddling the ears of said housing, and a latch having one end adapted to project through the instrument panel into the path of the striker member carried by said glove compartment door for interlocking engagement therewith and bifurcated arms at the other end thereof formed integrally with said one end and straddling the lower arms of said bell crank lever and pivotally connected thereto.

References Cited in the file of this patent
UNITED STATES PATENTS

| 508,361   | Young  | Nov. 7, 1893  |
| 957,938   | Cox    | May 17, 1910  |
| 2,313,711 | Jacobi | Mar. 9, 1943  |